United States Patent
Pasquale et al.

(10) Patent No.: US 8,589,812 B2
(45) Date of Patent: Nov. 19, 2013

(54) PRIORITIZED USER INTERFACE

(75) Inventors: Theodore Pasquale, Austin, TX (US); Kurt M. Joseph, Austin, TX (US); Scott Mills, Arlington, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1000 days.

(21) Appl. No.: 11/926,728

(22) Filed: Oct. 29, 2007

(65) Prior Publication Data

US 2008/0046830 A1    Feb. 21, 2008

Related U.S. Application Data

(63) Continuation of application No. 10/646,631, filed on Aug. 22, 2003, now Pat. No. 7,308,288.

(51) Int. Cl.
*G06F 3/048* (2013.01)

(52) U.S. Cl.
USPC ........... 715/764; 715/783; 715/794; 715/810; 715/811; 715/825; 715/841

(58) Field of Classification Search
None
See application file for complete search history.

(56) References Cited

U.S. PATENT DOCUMENTS

| | | | |
|---|---|---|---|
| 5,774,357 A | 6/1998 | Hoffberg et al. | |
| 5,875,108 A | 2/1999 | Hoffberg et al. | |
| 5,937,189 A | 8/1999 | Branson et al. | |
| 6,125,287 A | 9/2000 | Cushman et al. | |
| 6,137,488 A * | 10/2000 | Kraft et al. | 715/866 |
| 6,449,660 B1 | 9/2002 | Berg et al. | |
| 6,513,152 B1 | 1/2003 | Branson et al. | |
| 6,766,017 B1 | 7/2004 | Yang | |
| 6,961,590 B1 * | 11/2005 | Toebes | 455/564 |
| 7,269,799 B2 * | 9/2007 | Lee et al. | 715/810 |
| 7,546,602 B2 * | 6/2009 | Hejlsberg et al. | 719/313 |
| 7,721,254 B2 * | 5/2010 | Relyea et al. | 717/109 |
| 7,987,491 B2 * | 7/2011 | Reisman | 725/112 |
| 2002/0126157 A1 * | 9/2002 | Farago et al. | 345/810 |
| 2003/0040850 A1 | 2/2003 | Najmi et al. | |
| 2004/0043758 A1 * | 3/2004 | Sorvari et al. | 455/414.1 |
| 2004/0198431 A1 * | 10/2004 | Yamagishi et al. | 455/556.1 |
| 2004/0252965 A1 * | 12/2004 | Moreno et al. | 386/46 |
| 2005/0054384 A1 | 3/2005 | Pasquale et al. | |
| 2006/0200774 A1 * | 9/2006 | Flam et al. | 715/764 |

* cited by examiner

*Primary Examiner* — Steven Sax
*Assistant Examiner* — Anil Kumar
(74) *Attorney, Agent, or Firm* — Toler Law Group, PC

(57) ABSTRACT

Prioritized user interfaces are disclosed. A user interface may include a menu including a plurality of selectable items displayed in respective menu positions. A menu position of at least one of the plurality of selectable items is assigned based on a prioritization level of the at least one selectable item. The prioritization level is based at least partially on a selection metric for the at least one selectable item. The user interface may also include a menu locator indicating a location of a menu within a multi-level menu structure. The menu locator may include a first indicator of a position within a first level of the multi-level menu structure and a second indicator of a position within a second level of the multi-level menu structure.

16 Claims, 3 Drawing Sheets

PRIORITIZED USER INTERFACE

RELATED APPLICATIONS

The present application is a continuation of and claims priority to U.S. patent application Ser. No. 10/646,631, now U.S. Pat. No. 7,308,288, filed Aug. 22, 2003, the contents of which are incorporated by reference in their entirety.

FIELD OF THE DISCLOSURE

The present disclosure relates to user interfaces, and more particularly to a system and method for prioritized interface design.

BACKGROUND OF THE DISCLOSURE

In recent years, wireless-enabled electronic devices have become more pervasive. Historically, wireless capability may have been the near-exclusive domain of wireless telephones and pagers, but the category of wireless-enabled devices has grown to include several different device types including Personal Digital Assistants (PDAs), gaming devices, audio players, video players, and more.

Many of these devices, from wireless telephones to portable audio players, have also become more feature-rich. With the increased availability of new features, services, and technologies, device use has become more complex and user interface strategy has become more important.

User-interface designers often develop and test many different interfaces in an effort to ensure that device users will be able to easily and quickly navigate through the "laundry list" of available options. The increasingly complex interfaces being developed today face the additional challenge of a relatively small display space. Presenting a single screen with all the available features represented by a unique icon, word or phrase may not be possible.

As such, a need exists for a better interface—one that presents a device user with an easy to use and timely technique for accessing desired features.

BRIEF DESCRIPTION OF THE DRAWINGS

The present invention is pointed out with particularity in the appended claims. However, features are described in the following detailed description in conjunction with the accompanying drawings in which:

DETAILED DESCRIPTION OF THE DRAWINGS

Figure 1:
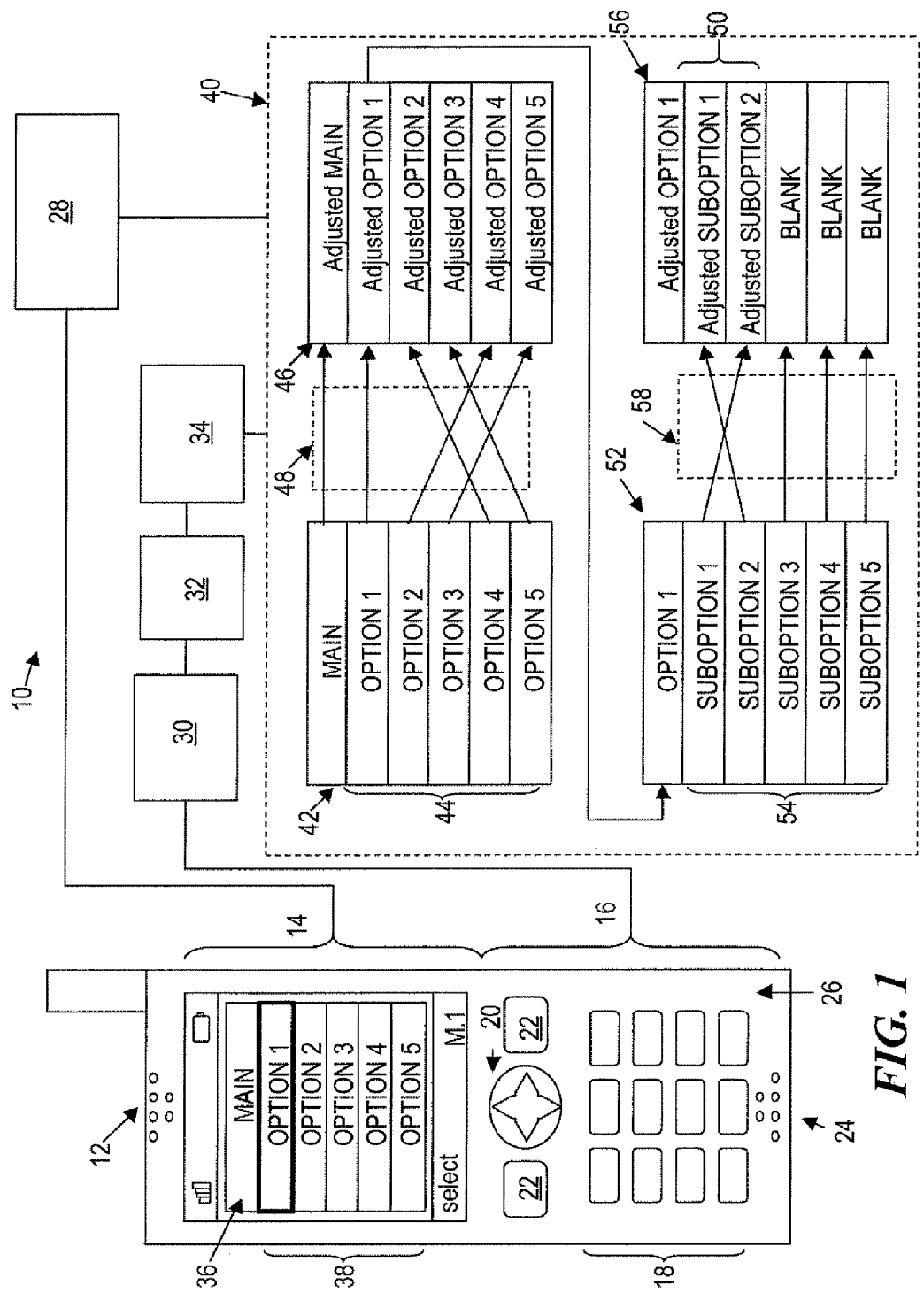
FIG. 1 presents an illustrative diagram of a user interface design system incorporating teachings of the present disclosure.

Prioritized user interfaces and computer-readable media are provided. In a particular embodiment, a computer-readable medium includes instructions executable by logic to present a menu. The menu includes a plurality of selectable items displayed in respective menu positions, and a menu locator indicating a location of a current menu within a multi-level menu structure. The menu locator includes a first indicator of a position within a first level of the multi-level menu structure and a second indicator of a position within a second level of the multi-level menu structure. The computer-readable medium also includes instructions executable by the logic to track at least one selection metric for at least one of the selectable items. The computer-readable medium further includes instructions executable by the logic to determine a prioritization level for the at least one selectable item. The prioritization level at least partially based on the at least one selection metric. The computer-readable medium also includes instructions executable by the logic to modify an assigned menu position for the at least one selectable item in response to a changed prioritization level for the at least one selectable item.

In a particular embodiment, a computer-readable medium includes instructions executable by logic to present a menu within a graphical user interface. The menu includes an available menu option displayed in a menu location. The computer-readable medium also includes instructions executable by the logic to receive a user input selecting the available menu option. The computer-readable medium further includes instructions executable by the logic to track a selection metric for the available menu option. The computer-readable medium also includes instructions executable by the logic to determine an appropriate menu location for the available menu option using the selection metric. The computer-readable medium further includes instructions executable by the logic to display the available menu option in the determined appropriate menu location in a first mode of operation when a metric-based menu display setting is selected, and instructions executable by the logic to display the available menu option in a preset menu location in a second mode of operation when a preset display setting is selected.

In a particular embodiment, a user interface includes a menu having a plurality of selectable items displayed in respective menu positions. A menu position of at least one of the plurality of selectable items is assigned based on a prioritization level of the at least one selectable item. The prioritization level is based at least partially on a selection metric for the at least one selectable item. The user interface also includes a menu locator indicating a location of a current menu within a multi-level menu structure. The menu locator includes a first indicator of a position within a first level of the multi-level menu structure. The menu locator also includes a second indicator of a position within a second level of the multi-level menu structure.

In a particular embodiment, a user interface includes a menu and an available menu option displayed in a menu location of the menu. When a preset display setting is selected, the menu location is a preset menu location. When a metric-based menu display setting is selected, the menu location is a determined appropriate menu location. The determined appropriate menu location is determined using a selection metric based at least partially on user input selections of the available menu options.

As mentioned above, electronic devices are becoming increasingly feature-rich. In an effort to make these devices easy to use, interface designers often need to develop and test many different interfaces to find an interface that allows device users to easily and quickly navigate through the "laundry list" of available options. With many devices, especially hand-held wireless-enabled devices, the increasingly complex interfaces being developed today face the additional challenge of a relatively small display space.

To address this display space shortage, a designer may create an interface that has a hierarchical format. The available features and/or selectable options may be grouped into increasingly broad categories so that a main menu screen may only present four or five options, with each of those options including some number of suboptions. The number of levels necessary likely depends on the total number of available options or features to be included in the interface menus.

While this menu and sub-menu structure overcomes some of the challenges presented by small displays, it may also require a user to move through several menu levels before eventually selecting the desired option. As mentioned above, FIG. 1 presents an illustrative diagram of a user interface design system 10 incorporating teachings of the present disclosure In the embodiment of system 10, a wireless-enabled device 12 may include a display 14 and user input mechanisms 16, which may include keypad 18, toggle disk 20, special buttons 22, microphone 24, a touch screen capable of receiving stylus inputs, some other input mechanism, and/or a combination thereof. Device 12 may also include a housing component like front panel 26 that at least partially defines an internal cavity.

As depicted in FIG. 1, device 12 also includes several engines like display engine 28, metric engine 30, priority engine 32, and mapping engine 34. Device 12 may include these engines locally, and the engines may be located within the cavity defined by front panel 26. Device 12 may also include additional engines and/or components that may support other functions and or features associated with device 12. Device 12, like other wireless-enabled devices, may have a wireless wide-area transceiver, which may be part of a multi-device platform for communicating data using radio frequency (RF) technology across a large geographic area. This platform may be a GPRS, EDGE, or 3GSM platform, for example, and may include multiple integrated circuit (IC) devices or a single IC device.

A Wireless-Enabled Device like device 12 may also have a wireless local area transceiver, which may communicate using spread-spectrum radio waves in a 2.4 GHz range, 5 GHz range, or other suitable range. The wireless local area transceiver may be part of a multi-device or single device platform and may facilitate communication of data using low-power RE technology across a small geographic area. For example, if the wireless local area transceiver includes a Bluetooth transceiver, the transceiver may have a communication range with an approximate radius of one hundred feet. If the wireless local area transceiver includes an 802.11(x) transceiver, such as an 802.11(a)(b) or (g), the transceiver may have a communication range with an approximate radius of one thousand feet.

In the embodiment of FIG. 1, display engine 28 may be capable of initiating presentation of a menu like menu 36 that has several selectable items like options 38 displayed in respective menu positions. In some embodiments, metric engine 30 may track a selection metric or a group of selection metrics for one or more of options 38. The metrics being tracked may include, among others, frequency of selection, timing of selection, preceding selection, following selection, other selection metrics, and/or combinations thereof.

Priority engine 32 may be communicatively coupled to metric engine 30 and may be capable of determining a prioritization level for the individual selectable items of options 38. As depicted, OPTION 1 may have a prioritization level of 1, indicating that OPTION 1 should be displayed in the first position. Similarly, OPTION 2 may have a prioritization level of 2, indicating that OPTION 2 should be displayed in the second position.

In some embodiments, the assigned prioritization level may be modifiable and may be related to one or more selection metrics. In preferred embodiments, prioritization levels may be calculated using statistical modeling, which may apply a set of criteria and thresholds to level changes. The modeling technique may give different effect or weights to different selection metrics. An interface designer and/or a device user may not want prioritization levels to be based solely on one metric, like frequency of use. If two features have similar use patterns, their prioritization levels may switch frequently, which could cause a menu like menu 36 to change often.

As suggested above, a presented menu may change in response to a change in the prioritization level of a given selectable item. The change may occur in near real-time or may not take effect until after a user has restarted the electronic device. For example, as depicted in FIG. 1, OPTION 1 may initially have a prioritization level of 1 and, as such, justify presentation in the first position. If OPTION 1's prioritization level drops to 2 based upon some metric, OPTION 1 may maintain its first position presentation until the user turns device 12 off and then back on. Once back on, device 12 may present the user with OPTION 1 in the second position.

In preferred embodiments, device 12 may employ mapping engine 34 to help effectuate the modification of presentation levels. As depicted, mapping engine 34 may be communicatively coupled to priority engine 32 and data store 40, which may reside or be stored locally in some appropriate memory. In operation, mapping engine 34 may modify an assigned menu position for selectable items in response to changes in the prioritization level of the items.

In the embodiment of system 10, mapping engine 34 may manage a collection of linked lists located in data store 40. The linked lists may include a template 42 with fields 44 representing assignable menu positions. Fields 44 may be individually linked to selectable items, which are depicted in FIG. 1 as Adjusted OPTIONs and as being maintained in a separate list 46. By linking template 42 to list 46 with adjustable links 48, system 10 may effectively create an abstraction layer that allows mapping engine 34 to easily modify the assigned menu positions of several selectable items.

As shown, system 10 may also include a plurality of secondary selectable items identified as Adjusted SUBOPTIONS 50. The secondary selectable items may be displayable by display engine 28 and display 14 in response to receipt of a user input identifying one of the selectable items of options 38. In the embodiment represented by system 10, template 42 may be a primary template and may include fields 44 that represent assignable menu positions. As shown, OPTION 1 of fields 44 is linked to the selectable item represented as Adjusted OPTION 1. The field of list 46 containing Adjusted OPTION 1 may be linked to a secondary template 52. Secondary template 52 may include fields 54 representing dependent menu positions or menu positions that may be utilized in response to an initial user input selecting one of options 38. Operation of secondary template 52 may be similar to the implementation described above with reference to template 44 and list 46.

For example, fields 54 may be individually linked to dependent or secondary selectable items, which are depicted in FIG. 1 as Adjusted SUBOPTIONS 50 and as being maintained in a separate list 56. By linking Adjusted OPTION 1 through secondary template 52 to list 46 with adjustable links 58, system 10 may effectively create an additional abstraction layer that allows mapping engine 34 to easily modify the assigned menu positions of secondary selectable items as well. As shown in FIG. 1, secondary template 52 may include more than enough fields, and the additional fields may be linked to BLANK—telling display engine 28 that it may not need to use some of the display locations available on display 14.

In some embodiments incorporating teachings of the present disclosure, a device may present a prioritized interface by employing a computer-readable medium having computer-readable data to initiate presentation of a menu comprising a plurality of selectable items displayed in respective menu positions, to track at least one selection metric for at least one of the selectable items, to determine a prioritization level for the at least one selectable item at least partially based on the at least one selection metric, and to modify an assigned menu position for the at least one selectable item in response to a changed prioritization level for the at least one selectable item.

The computer-readable medium of a device incorporating teachings herein may include additional computer-readable data operable to maintain a template with fields representing assignable menu positions, at least one of the fields linked to the at least one selectable item, and to link the at least one selectable item to a different field in order to modify the assigned menu position for the at least one selectable item.

Figure 2:
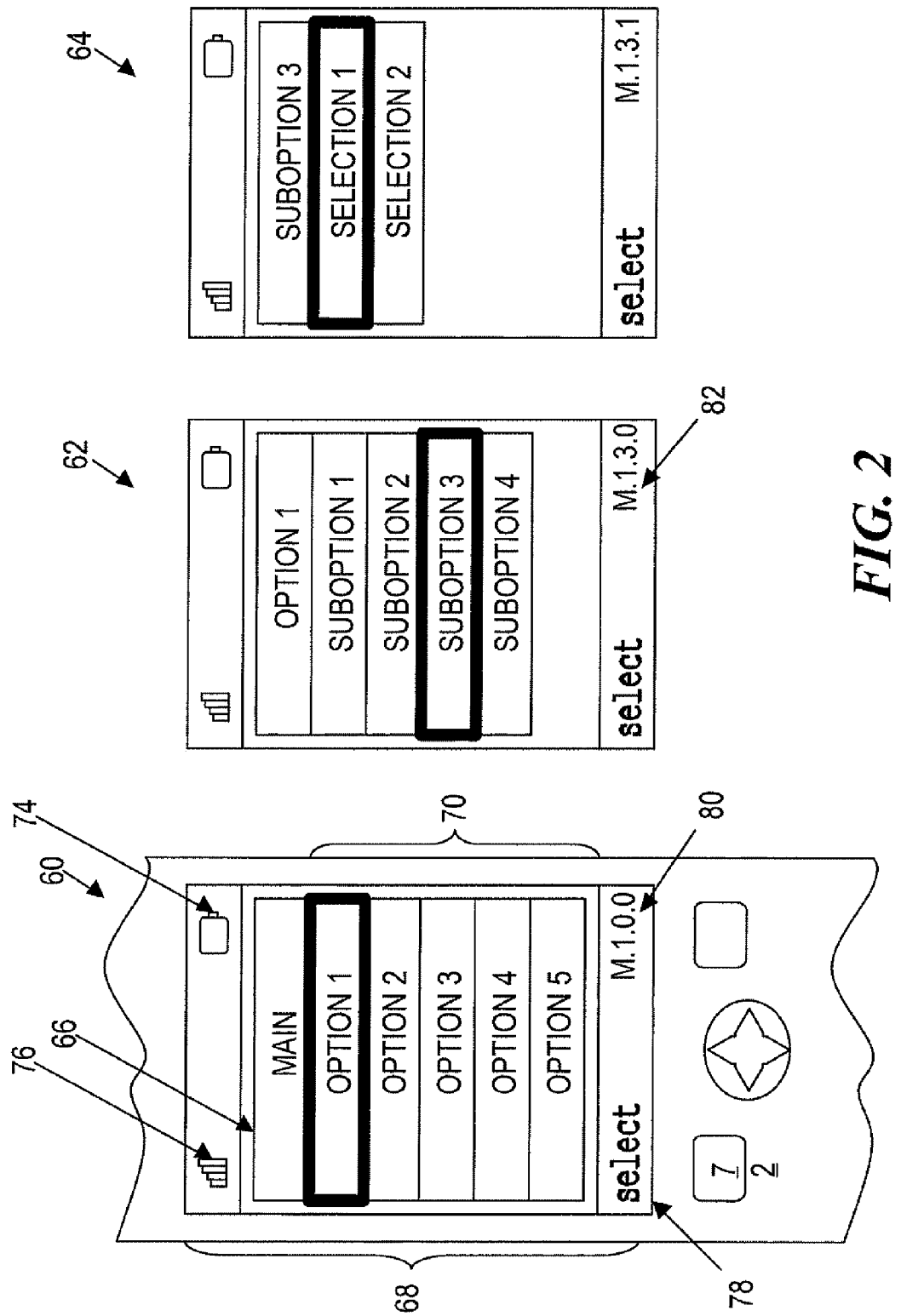
FIG. 2 shows a series of display screens presenting a user interface design incorporating teachings of the present disclosure.

Operation of a system incorporating teachings of this disclosure may be better understood by reference to FIG. 2. As mentioned above, FIG. 2 shows a series of display screens 60, 62, and 64, which present a user interface design that incorporates teachings of the present disclosure. In display 60, a user may be presented with a menu 66. Menu 66 may be presented to the user within a graphical user interface 68 of a wireless-enabled device like device 12 of FIG. 1. In other embodiments, menu 66 and teachings of this disclosure may be employed with any electronic device. For example, a computer accessing the Internet or a wireline telephone with a rich feature set.

As depicted, menu 66 may include a list of available menu options 70 displayed in respective menu or screen locations. A system like system 10 of FIG. 1 may receive a user input selecting an available menu option. As depicted, the user has selected OPTION 1 by highlighting OPTION 1 and depressing special button 72. The act of selecting OPTION 1 may advance the user to display 62, which includes a list of suboptions or secondary selectable items. The user input selecting OPTION 1 may be noted and a metric engine 30 of FIG. 1 may track a selection metric like number of selections for OPTION 1. The selection metric may be used to determine the appropriate menu location for OPTION 1. In light of the user selecting OPTION 1, a priority engine like priority engine 32 of FIG. 1 may determine that OPTION 1 is in the correct menu location.

If the priority engine does determine that the current menu location is inappropriate, a mapping engine like mapping engine 34 of FIG. 1 may remove a link associating OPTION 1 with its current location and add a link associating OPTION 1 with a modified location. Modifying the linking arrangement may result in the presentation of a modified menu—with OPTION 1 presented in a modified location.

Interface 68 may present a user with several pieces of information. For example, interface 68 may present a battery life indicator 74, a signal strength indicator 76, special button designator 78, and a current menu locator 80. Menu locator 80 may help users keep track of their current location within the menu structure of an interface. For example, in display screen 60, the user is in the top level of the menu tree, which may be designated with an "M" in locator 80. The user is also selecting the option in the first menu location, which may be designated with a "1". In display screen 62, the user is selecting suboption 3, which may be designated with a "3" in menu locator 82. Knowing the menu address presented in menu locators 80 and 82, may allow a user to jump directly to a given display screen. For example, a user may type in "M.1.3.0" and jump directly to display screen 64.

In some systems like system 10 of FIG. 1, a user may want the option of "resetting" the menus back to a factory setting. For example, a user may like having the ability to jump to a given menu by typing in a menu address. The user may not want the effectiveness of the menu addressing capabilities to be reduced by a frequently changing menu structure. As mentioned above, an interface prioritization technique that incorporates teachings of the present disclosure may customize a user interface automatically—tracking feature and option selections to determine feature screen placement and to define the customized or modifiable interface.

To facilitate "resetting" the menus, a system like system 10 may additionally store a preset display template that directly links available menu options to menu locations. In preferred embodiments, a fixed menu structure and a modifiable menu structure may be included in the same device. A user of such a device may be able to toggle between factory settings and customized settings. Some devices may also allow a user to manually customize an interface with drag and drop technique or some other display-altering mechanism. In such a device, the user may be able to toggle between three menu structures: factory settings; manually customized; and, a metric-based prioritized structure.

Figure 3:
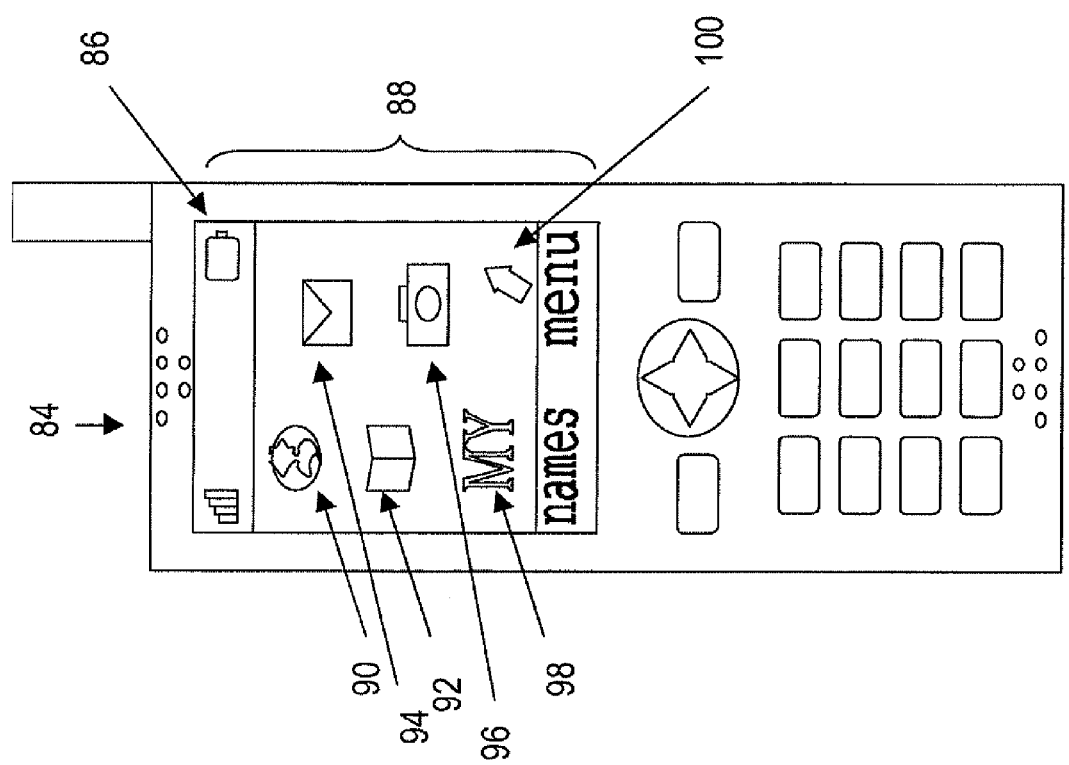
FIG. 3 depicts a wireless enabled device that incorporates teachings of the present disclosure.

As mentioned above in the brief description of the drawings, FIG. 3 depicts a wireless enabled device 84 that incorporates teachings of the present disclosure. Device 84 includes a display 86 presenting a user with a graphical user interface 88. GUI 88 includes five selectable items in respective menu locations. The five selectable items are presented as icons including web access icon 90, address book icon 92, mail icon 94, camera feature icon 96, and personal content icon 98. A user may select one of the icons with screen pointer 100.

The presented icons of FIG. 3 may represent items on the main menu. As different menu options are selected, a system like system 10 may track a selection metric and move menu items to more appropriate positions. For example, if a user of device 84 begins using text messaging more frequently, the text-messaging icon may move from under the mail icon to the main menu. If the user begins taking more pictures with device 84, camera feature icon 96 may move up to a more prominent position within the main menu.

Similarly, a user may have ten phone numbers under address book icon 92. If the tenth number is the most frequently called, the number may move from the tenth location to the first so that the user no longer needs to scroll through the other nine numbers to get to the one used most often. In other words, the user interface may change as the user's needs, preferences, and/or tendencies change.

Much like the address book and the main menu description above, web site links, which may be stored as uniform resource locators (URLs) under web access icon 90 may be auto adjusted to move the user's "favorite sites" as determined by the user's own activity to the top or higher priority menu positions.

The prioritization systems, methods, and techniques disclosed herein may be employed to improve the interface designs of many different types of devices. While the above discussion focuses on wireless-enabled devices, devices that are not wirelessly enabled may also make use of the teachings herein.

The above description also focuses on engines as one possible way of implementing some of the teachings disclosed herein. Engines may be implemented in software, firmware, hardware or some other logic and or logic/memory combination. In addition, a designer of an interface system may use something other than an engine without departing from the scope of the present invention. Systems incorporating the teachings disclosed herein will preferably allow a "laundry list" of available features to be presented on a display with limited screen size, and the "laundry list" will preferably be presented in a sequence that simplifies and expedites a user's ability to find the features the user wants.

It will be apparent to those skilled in the art that the disclosed embodiments may be modified in numerous ways and may assume many embodiments other than the particular forms specifically set out and described herein.

Accordingly, the above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-readable storage device, comprising instructions executable by logic to perform operations comprising:
    displaying, at a mobile device, a graphical user interface with a menu that comprises:
    a plurality of selectable items displayed in respective menu positions; and
    a menu locator indicating a location of a menu within a multi-level menu structure, the menu locator including at least a first indicator and a second indicator, wherein the first indicator corresponds to a position within a first level of the multi-level menu structure, wherein the second indicator corresponds to a position within a second level of the multi-level menu structure, wherein the first indicator and the second indicator are displayed concurrently prior to selection of a particular selectable item within the second level of the multi-level menu structure;
    in response to a selection of a first selectable item at the first level of the multi-level menu structure, updating the second indicator to indicate a first position within the second level of the multi-level menu structure corresponding to the first selectable item;
    tracking at least one selection metric for at least one selectable item of the plurality of selectable items;
    determining a prioritization level for the at least one selectable item, the prioritization level at least partially based on the at least one selection metric;
    determining a modified menu position within the menu for the at least one selectable item based on a change in the prioritization level for the at least one selectable item; and
    in response to detecting a restart of the electronic mobile device, updating the graphical user interface to present the at least one selectable item at the modified menu position in the menu.

2. The computer-readable storage device of claim 1, wherein the operations further comprise modifying the graphical user interface to display one or more of a plurality of secondary selectable items in the menu in response to receiving data indicating selection of the at least one selectable item.

3. The computer-readable storage device of claim 2, wherein the operations further comprise tracking one or more second selection metrics for at least one of the plurality of secondary selectable items.

4. The computer-readable storage device of claim 1, wherein the operations further comprise accessing a template with fields representing assignable menu positions, wherein at least one selectable item is displayed in the menu corresponding to a field within the template, and wherein at least one of the fields is a blank field that is not linked to the at least one selectable item.

5. The computer-readable storage device of claim 4, wherein the method operations further comprise linking the at least one selectable item at the modified menu position to a different field of the template.

6. The computer-readable storage device of claim 1, wherein the operations further comprise:
    modifying the graphical user interface to display one or more of a plurality of secondary selectable items in the menu in response to receiving data indicating selection of the at least one selectable item;
    accessing a primary template having fields representing assignable menu positions, wherein the at least one selectable item is displayed in the menu corresponding to at least one of the fields within the template, the at least one of the fields additionally linked to a secondary template; and
    accessing the secondary template having fields representing dependent menu positions linked to the respective secondary selectable items.

7. The computer-readable storage device of claim 1, wherein the operations further comprise accessing a preset display template linking the plurality of selectable items to fixed menu positions in the menu.

8. The computer-readable storage device of claim 1, wherein the operations further comprise modifying the graphical user interface to present a particular level of the multi-level menu structure according to a menu address received via input to the mobile device.

9. The computer-readable storage device of claim 1, wherein the restart of the mobile device occurs when the mobile device is powered on after the mobile device has been powered off.

10. The computer-readable storage device of claim 1, wherein the operations further comprise determining the prioritization level for the at least one selectable item based on different weights assigned to each of a plurality of selection metrics for the at least one selectable item, wherein the plurality of selection metrics includes frequency of selection, timing of selection, preceding selection, following selection, or any combination thereof.

11. A device comprising:
    a processor; and
    a computer-readable storage device comprising instructions that, when executed by the processor, cause the processor to perform operations comprising:
        displaying, at a mobile device, a graphical user interface with a menu that includes an available menu option displayed in a menu location, wherein the menu location is based on a first template that is associated with the menu, wherein the menu includes a menu locator indicating a location of the menu within a multi-level menu structure, the menu locator including at least a first indicator and a second indicator, wherein the first indicator corresponds to a position within a first level of the multi-level menu structure, wherein the second indicator corresponds to a position within a second level of the multi-level menu structure, wherein the first indicator and the second indicator are displayed concurrently prior to selection of a particular selected item within the second level of the multi-level menu structure, and wherein the menu location correspond to a location within the first level of the multi-level menu structure;

in response to a selection of an available menu option at the first level of the multi-level menu structure, updating the second indicator to indicate a first position within the second level of the multi-level menu structure corresponding to the available menu option;

tracking a selection metric for the available menu option;

determining a prioritization level for the available menu option based on the selection metric for the available menu option;

determining a modified menu location for the available menu option based on a change in the prioritization level for the available menu option using the selection metric, wherein the modified menu location for the available menu option is stored at a second template that is associated with the menu; and in response to detecting a restart, updating the graphical user interface to present the available menu option based on the modified menu location stored within the second template.

12. The device of claim 11, wherein the restart of the device occurs when the device is powered on after the device has been powered off.

13. A method comprising:

displaying, at a mobile device, a graphical user interface with a menu that comprises:

a plurality of selectable items displayed in respective menu positions; and a menu locator indicating a location of the menu within a multi-level menu structure, the menu locator including at least a first indicator and a second indicator, wherein the first indicator corresponds to a position within a first level of the multi-level menu structure, wherein the second indicator corresponds to a position within a second level of the multi-level menu structure, wherein the first indicator and the second indicator are displayed concurrently prior to selection of a particular selectable item within the second level of the multi-level menu structure;

in response to a selection of a first selectable item at the first level of the multi-level menu structure, updating the second indicator to indicate a first position within the second level of the multi-level menu structure corresponding to the first selectable item;

tracking at least one selection metric for at least one selectable item of the plurality of selectable items;

determining a prioritization level for the at least one selectable item, the prioritization level at least partially based on the at least one selection metric;

determining a modified menu position within the menu for the at least one selectable item based on a change in the prioritization level for the at least one selectable item; and in response to detecting a restart of the mobile device, updating the graphical user interface to present the at least one selectable item at the modified menu position in the menu.

14. The method of claim 13, wherein the menu locator includes a third indicator corresponding to a position within a third level of the multi-level menu structure.

15. The computer-readable storage device of claim 1, wherein the menu locator includes a plurality of indicators, the plurality of indicators including the first indicator, the second indicator, and at least one additional indicator corresponding to a position within a third level of the multi-level menu structure, wherein the first indicator, the second indicator, and the at least one additional indicator third indicator are displayed concurrently prior to selection of a particular selectable item within the second level of the multi-level menu structure and prior to selection of a particular selectable item within the third level of the multi-level menu structure, and wherein each of the plurality of indicators represents a corresponding position within the multi-level menu structure as one of a letter and a numerical value.

16. The computer-readable storage device of claim 6, wherein the operations further comprise linking the at least one selectable item at the modified menu position to a different field of the template.

* * * * *